(12) United States Patent
Kislyi

(10) Patent No.: US 9,248,372 B2
(45) Date of Patent: Feb. 2, 2016

(54) USING AND EXPORTING EXPERIENCE GAINED IN A VIDEO GAME

(75) Inventor: Victor Kislyi, Minsk (BY)

(73) Assignee: Wargaming.net LLP, London (GB)

( * ) Notice: Subject to any disclaimer, the term of this patent is extended or adjusted under 35 U.S.C. 154(b) by 615 days.

(21) Appl. No.: 13/253,956

(22) Filed: Oct. 5, 2011

(65) Prior Publication Data

US 2013/0090173 A1    Apr. 11, 2013

(51) Int. Cl.
*A63F 13/10*    (2006.01)
*A63F 13/30*    (2014.01)

(52) U.S. Cl.
CPC .......... *A63F 13/12* (2013.01); *A63F 2300/575* (2013.01); *A63F 2300/65* (2013.01)

(58) Field of Classification Search
USPC ............................................ 463/1, 40, 43, 31
See application file for complete search history.

(56) References Cited

U.S. PATENT DOCUMENTS

| 5,971,855 | A  | * | 10/1999 | Ng ................................ 463/42 |
| 8,142,277 | B2 | * | 3/2012  | Kato et al. ...................... 463/23 |
| 9,004,997 | B1 | * | 4/2015  | Prosin et al. ..................... 463/5 |
| 2002/0115483 | A1 | * | 8/2002 | Fujiwara et al. .................. 463/7 |
| 2009/0247250 | A1 | * | 10/2009 | Kato et al. ....................... 463/2 |
| 2010/0261526 | A1 | * | 10/2010 | Anderson et al. ............... 463/31 |
| 2012/0004034 | A1 | * | 1/2012 | Pope et al. ...................... 463/36 |
| 2012/0064969 | A1 | * | 3/2012 | Uchibori ......................... 463/29 |

OTHER PUBLICATIONS

World of Tanks, European Server, Technical Support Service, Free experience, 1 page, Jul. 7, 2011.
World of Tanks [Archive]—Game portal NORD OST, downloaded from <forum.mordost.su/archive/index.php/t-7557.html>, 30 pages, Jun. 15, 2010.
World of Tanks, Wikipedia article Aug. 16, 2010 in Russian with English translation, 18 pages.
Non-Final Office Action issued in related U.S. Appl. No. 13/472,970 on Aug. 16, 2012.
Final Office Action issued in related U.S. Appl. No. 13/472,970 on Jan. 29, 2013.

* cited by examiner

*Primary Examiner* — Pierre E Elisca
(74) *Attorney, Agent, or Firm* — Banner & Witcoff, Ltd.

(57) ABSTRACT

Methods and systems for awarding experience points to players of video games are disclosed. A video game such as a vehicle-based combat game may award experience of different classes, which allows control over the pace at which certain players advance through the game. Users may be awarded multiple classes of experience points, where a first class of experience may be restricted for use only in unlocking objects in a tech tree of the vehicle in which the first class of experience was earned vehicle, whereas a second class of experience may used to unlock any vehicle or module, not limited by tech tree. In some aspects, experience and/or vehicles/modules may be exported between video games.

17 Claims, 10 Drawing Sheets

USING AND EXPORTING EXPERIENCE GAINED IN A VIDEO GAME

FIELD

Aspects of the disclosure relate to computer systems and computer software. More particularly, aspects of the disclosure relate to video game software, methods of administering massive multiplayer online games, managing player experience levels and progress, and methods of playing video games.

BACKGROUND

Video games are increasingly popular. Online multiplayer video games have become particularly popular due, at least in part, to the ability of players to compete with multiple other human players.

Popular genres of multiplayer games include the first-person-shooter (FPS) and the third-person shooter genres. In FPS games, the player's on-screen view simulates the view of the character or vehicle controlled by the player; that is, the first-person view. The object of many FPS games is to accomplish a goal within a game. Common goals include killing other game characters that represent other players, capturing flags that represent opponents' territory, assaulting another team's base, and the like. Third person shooter games often have similar goals but differ in the perspective of the player. In third person shooters, the player views the game world from above or behind the character or vehicle controlled by the player.

Because online multiplayer games have become increasingly common, there is substantial competition between the offered games regarding obtaining and retaining consumers. Repetitive play can often lead to players becoming bored with a particular game.

SUMMARY

An aspect of the disclosure provides one or more tangible computer readable media storing computer executable instructions that, when executed, cause a system to perform a method. The method includes a step of defining a first class of experience in a first graphically simulated virtual world hosted on one or more game servers, wherein the first class of experience is earned when a user uses a first vehicle in the graphically simulated virtual world, wherein until a predetermined condition is met said first class of experience is usable only to unlock objects in a same tech tree as the first vehicle. The tech tree may include both modules compatible with the first vehicle, as well as vehicles within a same family as the first vehicle The method also includes defining a second class of experience in the first graphically simulated virtual world, wherein the second class of experience is earned when the user uses the first vehicle in the first graphically simulated virtual world, and wherein the second class of experience is usable to unlock vehicles not in the same tech tree as the first vehicle, and further usable to upgrade objects not compatible with the first vehicle. In some aspects only the first class of experience may be used to unlock vehicles in the same tech tree as the first vehicle. In other aspects either the first or second classes of experience may be used to unlock vehicles in the same tech tree as the first vehicle.

DETAILED DESCRIPTION

In the following description of the various aspects, reference is made to the accompanying drawings, which form a part hereof, and in which is shown by way of illustration how various features described herein may be practiced. It is understood that other embodiments may be used and structural and functional modifications may be made.

Figure 1:
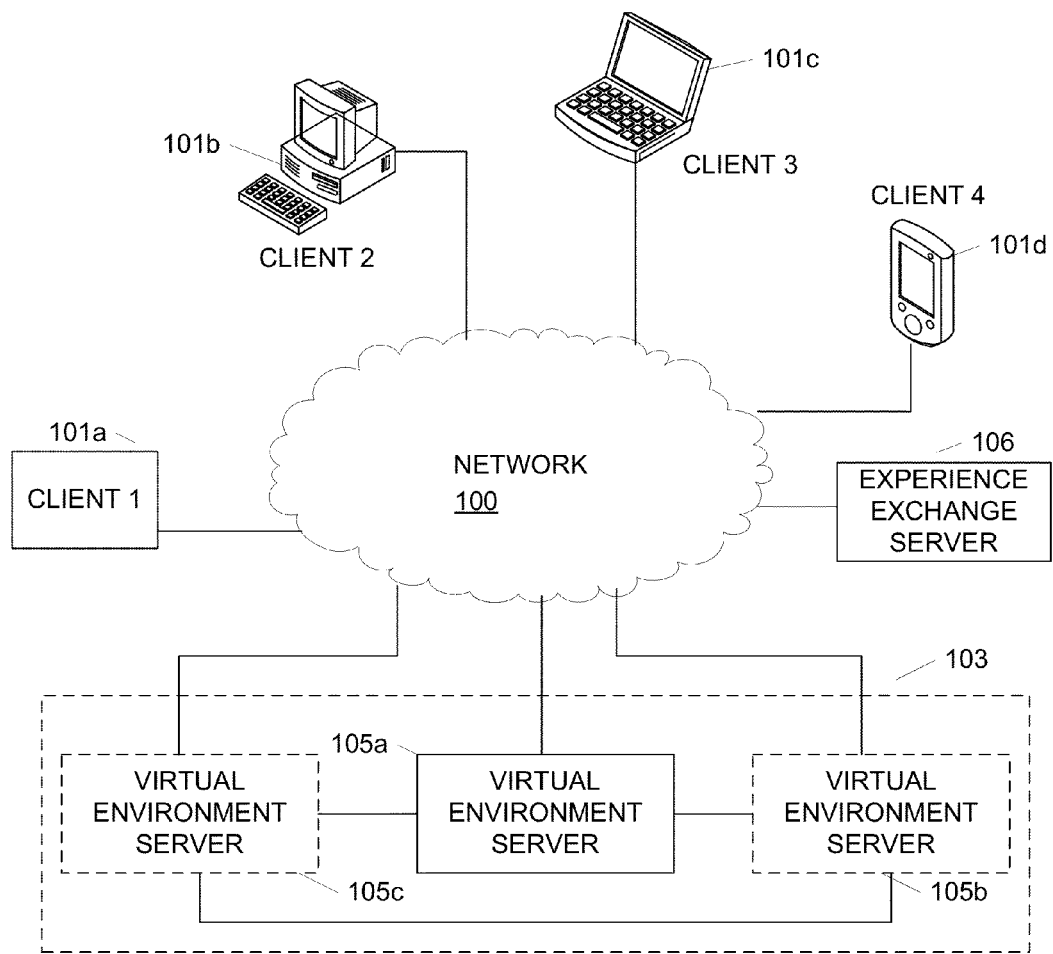
FIG. 1 is an illustrative network environment in which one or more aspects described herein may be used.

FIG. 1 illustrates a network environment in which clients 101 may interact with virtual world servers 105 to provide a virtual world for users to access. Clients 101 may include a variety of devices including generic data processing device 101a, personal computer (PC) 101b, laptop, portable, or netbook computer 101c, personal data assistant, mobile phone or device 101d, a tablet device (not shown) and the like. Each of clients 101 may have a network adapter that allows clients 101 to connect to virtual world servers 105 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs), wide area networks (WANs), and the like.

In one or more arrangements, virtual world servers 105 may be included in a virtual world server system 103 that includes multiple linked servers 105. Using such a distributed system, servers 105 may be able to distribute load across each of server 105. For example, if server 105a is experienced high loads, some of the operations may be passed to either server 105b or 105c or both. Load may further be distributed based on user geography or on other predetermined bases. Alternatively, the virtual world may be hosted on a single server, e.g., virtual world server 105a. Each of servers 105 may collectively generate and manage a single instance of the virtual world, or each server 105a, 105b and 105c may provide independent instances of the world. An instance of a virtual world, as used herein, describes a stand-alone copy of the virtual world that does not interact with or depend on other instances of the virtual world. Depending on the processing load, a virtual world server system 103 may divide a plurality of users among multiple instances of the virtual world, each hosted on a different server, to reduce or alleviate overloading on a single server or prevent overpopulation. Each server 105 may be logical or physical, e.g., multiple logical servers may reside and be running on the same physical computing device/server, or servers may be physically separate devices.

The network environment of FIG. 1. may also associate with one or more experience exchange servers 106. As used herein, an experience exchange server 106 may allow the exchange of one or more classes of user experience points and/or levels between different virtual worlds (e.g., a different game than the game on which the experience points were obtained). The different virtual world may be associated with the virtual world server system 103 and/or may be associated with one or more different virtual world server systems (not shown).

Figure 2:
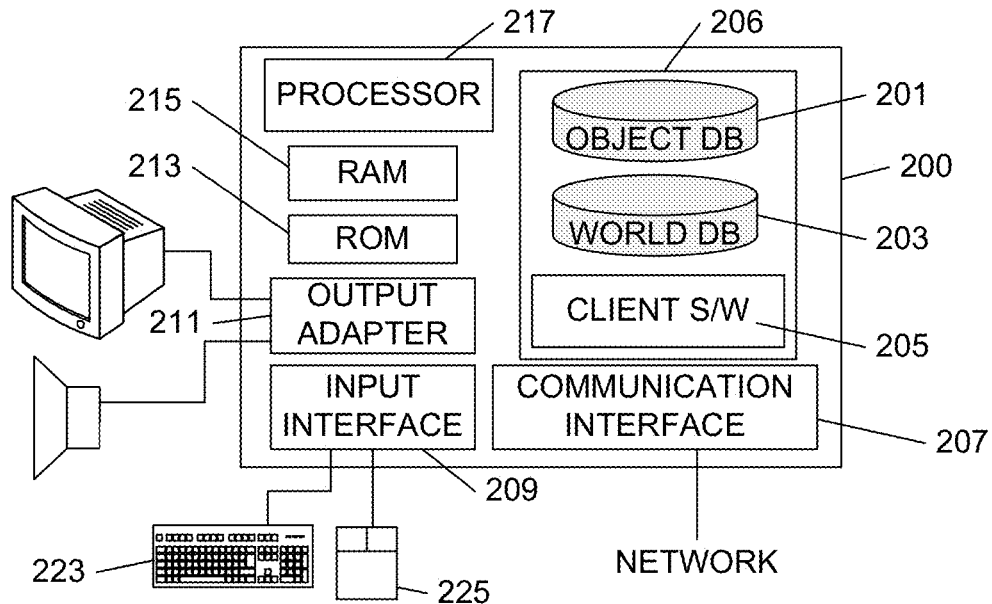
FIG. 2 is a block diagram illustrating an example virtual world client according to one or more aspects described herein.

FIG. 2 illustrates an example client device 200 such as PC 101b (FIG. 1) that may be used to access and interact with a virtual world provided by a virtual world server such as server 105a of FIG. 1. Client device 200 may include a variety of components and modules including a processor 217, random access memory (RAM) 215, read only memory (ROM) 213, databases 201 and 203, client software 205, output adapter 211, input interface 209 and communication interface 207. Software, databases, operating systems, and the like may be stored in nonvolatile memory 206 (e.g., a magnetic disk or solid state hard drive, or equivalent). Object database 201 may be configured to store data defining and otherwise associated with an object used by a user of device 200 to explore and interact with the virtual world. World database 203, on the other hand, may be configured to store data for defining and generating the environment in which the objects exist. For example, world database 203 may store texture maps for rendering a floor or ground, walls, a sky and the like. In another example, world database 203 may store simulated environments, buildings, trees and other data defining animate or inanimate objects existing in the world, data defining computer controlled characters and the like. Each of database 201, 203 may or may not be a conventional database, and instead may refer to data stored in a memory, accessed as needed by the client software. Data associated with an object or the virtual world may be communicated between client device 200 and a virtual world server using communication interface 207. For example, object positions, attributes and status may be updated or environments may be changed by communicating such data through interface 207.

The world and the objects may be rendered by client software 205 and subsequently sent to output adapter 211 and display 219. The client software 205 may, in one or more arrangements, be configured to generated three dimensional (3-D) models of the virtual world and components thereof as well as the object corresponding to a user. A user may control the object and interact with the world through input interface 209 using various types of input devices including keyboard 223 and mouse 225. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored RAM 215, ROM 213, nonvolatile memory 206 or a combination thereof. Other types of memory may also be used, including both volatile and nonvolatile memory. Software 205 may provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or nonvolatile memory 206. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
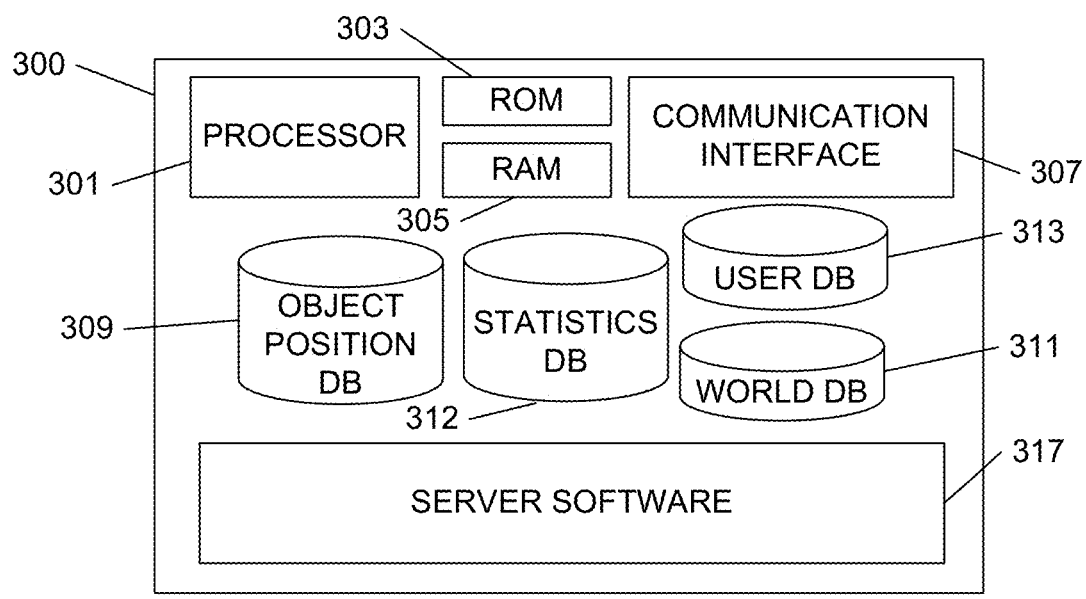
FIG. 3 is a block diagram illustrating an example virtual world server according to one or more aspects described herein.

Referring now to FIG. 3, a virtual world server 300 may be configured to generate and operate a massive multiplayer online game, such as virtual world or the like. Server 300 may include processor 301, ROM 303, RAM 305, communication interface 307, object position database 309, world database 311, user database 313, server software 317, and a statistics database 312. Object position database 309 may be configured to store position information for each object (e.g., based on commands to move a vehicle received from each client). The statistics database 312 may be configured to store and/or transfer statistics relevant to game operation, including, for example, tracking player achievement and general game server performance.

A world database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store information describing a user controlling an object. For example, user database 313 may include account information, user preferences, one or more classes of user experience points and/or levels, payment information, user identification information, character definitions, state tables, and the like. Each of databases 309, 311, 312, 313 may or may not be a conventional database, and instead may refer to data stored in a memory, accessed as needed by the server software. For example, user database 313 may in fact be a collection of multiple databases or database tables.

Features described herein may be used with or in a variety of video games, including but not limited to, WORLD OF TANKS™ by Wargaming.net®. Aspects described herein may also be used with other video games and are not limited to any one genre or implementation. Aspects described herein may be implemented in video game application software stored on a computer readable medium, e.g., storage 201, 203, 205, 206, 213, 215, 309, 311 312, and/or 313, and executable by a data processing device.

Various aspects of the disclosure provide features and capabilities that enhance game play by providing options through which users can develop strategies to play the video game. According to various aspects described herein, a video game may provide a graphically stimulated virtual world or virtual environment, in which the game takes place, referred to herein interchangeably as a virtual world and as a simulated environment of the video game. The simulated environment may have features similar to actual geographic locations or may have fictional, science fiction or fantasy-themed environments.

According to various aspects, the game may involve multi-player combat-based tournaments combined with an experience-based reward system. As users accomplish predefined tasks or achievements within the game, the player may be given one or more types of reward points. Reward points may subsequently be exchanged for in-game items, goods, features, etc., or otherwise used in accordance with one or more aspects described herein. In one example, reward points may be used to initiate or perform "research" to unlock more powerful, stronger, or otherwise more desirable elements within the game. The discussion below indicates various features and items that may be researched and used, as a player develops a character or vehicle within the game.

Figure 4:
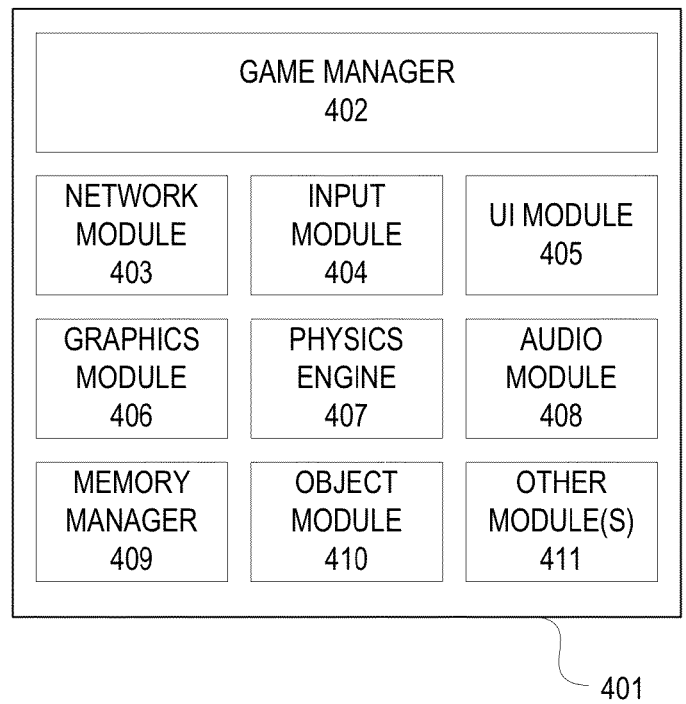
FIG. 4 illustrates a block architecture diagram of software modules that may be used to implement various features described herein.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules operate collectively to provide a video game experience to a player. The modules illustrated in FIG. 4 are illustrative only, and additional or different modules may be used. The same, additional or different modules may be executed in tandem on a server with which each client device is connected.

Video game software 401 may include, e.g., a game manager module 402, which manages the overall operation of the video game and may be the initial module launched when the video game is executed. Video game software 401 may also include a network module 403, which manages network games sessions. A network game session may include e.g., a co-operative campaign with other networked players, or other compartmentalized periods of game play involving players located at discrete network locations. A memory manager module 409 performs memory management during execution of the video game 401. An input module 404 may receive and interpret user input via a game controller, keyboard, mouse, and the like, and provide the interpreted commands to game manager 402, network module 403, or other applicable module. UI module 405 may manage and control the user interface, including the display displayed on the video output device, interpreting input via the input module 404, and providing audio output via audio module 408.

Various software modules may operate with one or more classes or objects defined and used in the video game 401. The classes and objects may be defined with reference to an object module 410, and may include portions of executable software code and/or one or more data structures, depending on the object. Each object may be rendered and simulated in the virtual world in accordance with a physics engine 407. Video game software 401 may include other software modules 411 as needed. FIG. 4 illustrates one possible software architecture. Others may be used. Each module depicted in FIG. 4 may communicate directly or indirectly with each other module, e.g., by passing objects, data, parameters, input, and output, etc.

A first class of in-game objects may define characters in the video game. Characters may be defined by various attributes associated with the character, e.g., name, physical appearance, skills, etc. Skills may be defined based on a character's genre or task, e.g., gunners, tank commanders, and drivers in the present example. A gunner may have skills such as aiming accuracy and aiming speed, a tank commander may have skills that regulate the overall efficiency of the tank crew, a driver may have skills that determine the vehicle speed or precision of direction. Additional character attributes may include one or more other skills that can improve performance of the character or vehicle so as to enhance the strategic gaming experience such as firefighting skills, the ability to repair vehicles, the ability to camouflage vehicles, and the like.

A second class of in-game objects may define vehicles in the video game. A vehicle may be defined as any simulated inanimate object directly or indirectly controllable by or dependent on an in-game character or user/player. Illustrative vehicles may include tanks, airplanes, ships (and/or submarines), and the like. Vehicles may have various attributes and functions that provide advantageous qualities to the vehicle during combat. For example, some vehicles might be fast with minimal firepower, whereas other vehicles may be slower but extremely powerful. Infinite variations of strength, speed, defense, and any other attribute are possible.

Object module 410 may provide an array of vehicles, vehicle components, characters and other equipment. Vehicles, vehicle components, characters and other equipment may be defined by one or more objects and instantiated during the game. Each object may have various attributes and functions and provide advantages and disadvantages based thereon. A vehicle component may refer to an upgradeable component of a vehicle, e.g., armor plating, engine, guns, etc.

Figure 5A:
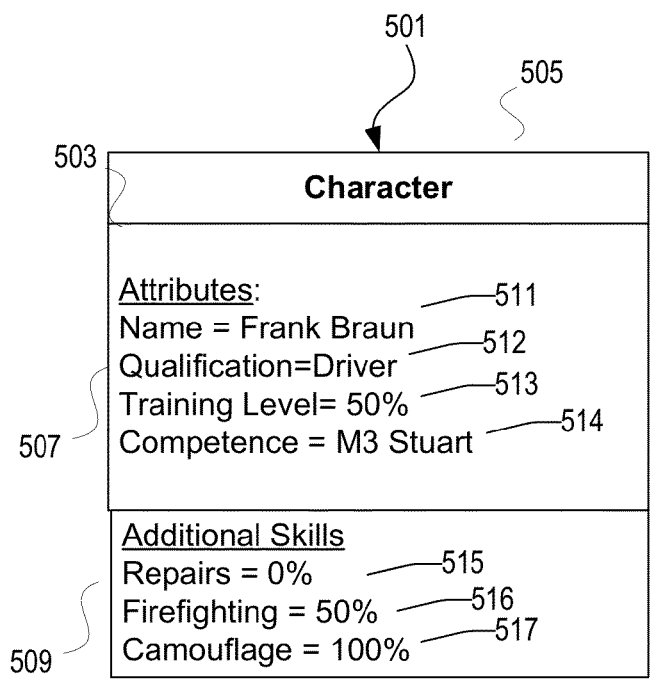
FIG. 5A illustrates an instance of a character object according to various features described herein.

FIG. 5A illustrates a block diagram of an instance 501 of a character object. Object instance 501 has an object class 505 (Character). Instance 501 may acquire one or more attributes from the object class. Attributes 507, when examined, define a state of the instance. In this example, the Character has the following attributes: Name 511, Qualification 512, Training Level 513, and Competence 514. A character may also have additional skill types 509. Additional skill types may include Repair Skills 515, Firefighting skills 516, and Camouflage skills 517. Other skill types, attributes, etc., may also or alternatively be used.

Each attribute may have a particular value. The attribute may have a default value inherited from the Qualification type 512. For some attributes, a player may increase attribute value by allocating experience points, gained during gameplay, to the character. Increased attribute value enhances gameplay by improving performance of the vehicle containing the characters. For example, by allocating experience points to the gunner of a tank, the Training Level 513 may be increased resulting in more accurate gun pointing by a vehicle containing that character, leading to improved vehicle performance during battle. Similarly, the effectiveness of the additional skill types is increased in accordance with the value of the skill. Thus, for example, a Firefighting skill 516 value of 100% is proportionally more effective than a value of 50%. Increased firefighting effectiveness results in reduced damage to the vehicle in the event of a fire. By staffing a vehicle with characters having improved attributes and skills, vehicle performance is maximized allowing for a more effective performance during game play.

In some embodiments, attributes might not be able to be changed. Qualification 512 may not be changed; for example, a driver may not be retrained as a gunner. A character's Competence attribute 514 refers to their ability to operate a specific vehicle type; for example a specific type of tank such as the M3 Stuart tank. Competence 514 may be changed by retraining the character to operate the same Qualification 512 on a different vehicle. Changing Competence 514 may result in a decreased Training Level 513 in the new vehicle. Additional experience points may be used to raise the Training Level 513 in the new vehicle. A character may eventually be associated with multiple competence attributes—one per vehicle the character has been associated with.

Figure 5B:
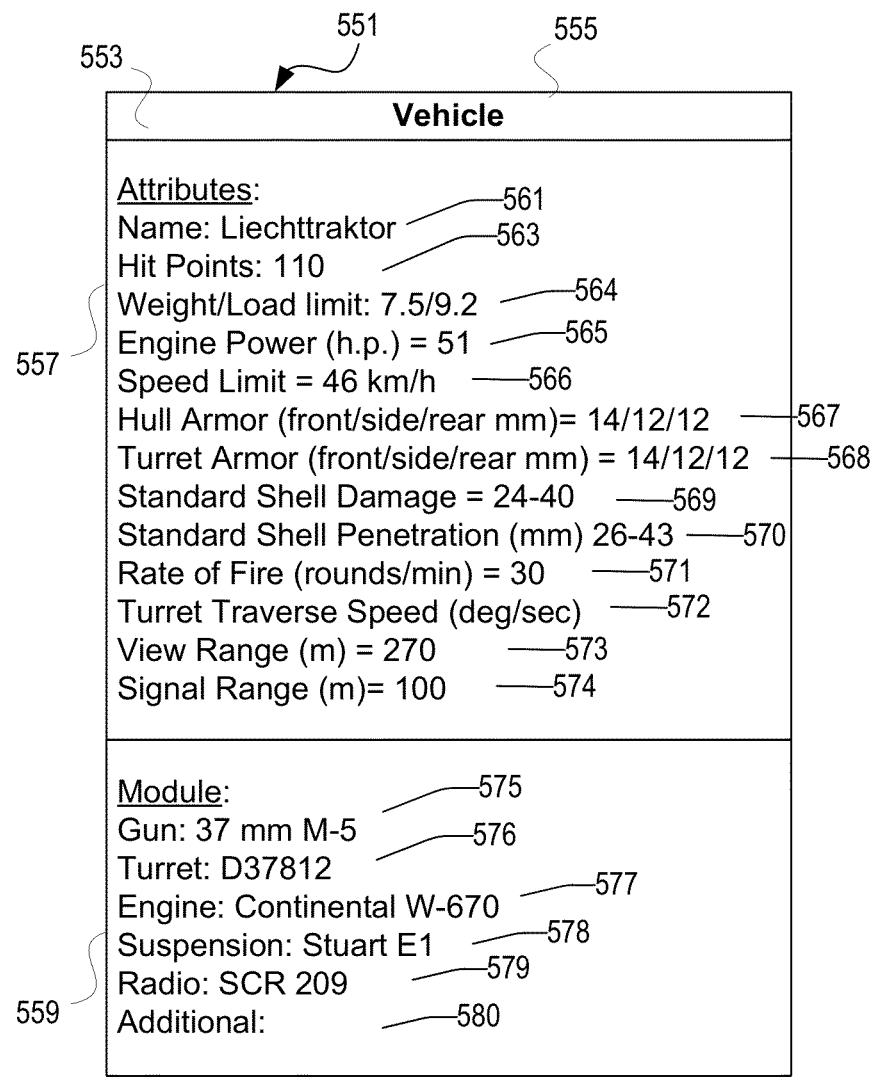
FIG. 5B illustrates an instance of a vehicle object according to various features described herein.

FIG. 5B illustrates a block diagram of an instance 551 of a vehicle object. Object instance 551 has an object class 555 (Vehicle). Instance 551 may acquire one or more attributes 557 from the object class. Attributes 557, when examined, define a state of the instance. In this example, object instance 551 is a Liechttraktor Tank and has attributes associated with tank properties. Exemplary attributes include Name 561, Hit Points 563, Weight/Load limit 564, Engine Power (h.p.) 565, Speed Limit 566, Hull Armor 567, Turret Armor 568, Standard Shell Damage 569, Standard Shell Penetration 570, Rate of Fire 571, Turret Traverse Speed 572, View Range 573, and Signal Range 574. These attribute contribute to the vehicle's effectiveness in combat. Attribute types may also have an attribute value, which determines the effectiveness of the attribute function. For example, the Speed Limit attribute 566 has a value of 46 km/h, which indicates how fast the vehicle can travel. One or more of the attributes, alone or in combination, may be used to assign the vehicle to a subclass. In this example, vehicle 551 may be in a subclass of tanks referred to as "Light Tanks" based on hit points, speed, armor, etc. Other classes of tanks may include medium tanks and heavy tanks, among others. Subclass may be used to quickly identify to a user a general approximation of attributes associated with a vehicle without requiring the user to review each attribute in detail.

Aspects of the disclosure involve altering object attributes in response to experience obtained within the game. Altering attributes provides for enhancing the skills of the character and enhancing properties of vehicle and vehicle components. Altered attributes provides the game player with vehicle and characters able to compete more effectively against other players.

Using Modules to Upgrade Vehicle Attributes

Vehicle attributes may be altered by adding or upgrading modules associated with a vehicle. A vehicle contains modules classes 559. Each module class may contain one of a variety of module types appropriate to the module class. In one example, module classes may include Gun 575, Turret 576, Engine 577, Suspension 578, and Radio 579. Additional 580 modules may be added to provide additional functions or otherwise modify vehicle attributes 557. Within each class, a vehicle may be outfitted with one module type that falls within the class. For example, five increasingly powerful gun types may be available within the gun class. Similarly, there may be multiple radio types within the radio class. Adding or changing a module type alters vehicle attributes 557 based on the effectiveness of the newly installed module type. Thus, for example, if the Radio module 579 type SCR 209 is replaced by a more advanced module the Signal Range 574 attribute value may increase based on a signal range value associated with the more advanced module. An increased Signal Range value, in turn, may allow the vehicle to detect enemies at greater distances during game play, making the player more competitive against opponents and resulting in an enhanced gameplay experience for that player.

Experience Points and Research

During game play (e.g., between game sessions), new vehicles and new modules for vehicles may be unlocked by a player in exchange for experience points. In some embodiments, a user might gain points for a single experience class. In other embodiments, points may be earned for two or more different experience classes. Different experience classes may be used to gain access to different features in the game. For example, points earned in a first experience class may be used to allow a user access to a first set of game objects (e.g. vehicles and/or vehicle modules) but not a second, different set of game objects. Points earned in the second experience class may be used to allow a user access to a different set of game objects than the first experience class. The first and second sets may share some objects in common, or may instead be completely distinct.

In one example, where the first experience class is battle experience, battle experience may be used to unlock any object in the same tech tree as the vehicle in which the battle experience was earned, but may not be used to unlock objects not in the same tech tree as the vehicle in which the experience was earned. In this example, where the second experience is free experience, the free experience may be used to unlock any object in any tech tree, regardless of the vehicle in which the free experience was earned.

Collectively, the experience classes may be referred to herein as the "Primary Currency" of the game. Primary Currency is the main route for players to acquire upgraded vehicles, modules, and personnel. A second type of currency, defined herein as "Alternative Currency" may be provided to a player in exchange for alternative compensation, e.g., by completing secondary in-game tasks, completing objectives, or in exchange for the payment of money. In some embodiments, the software may allow some or all of a first experience class to be converted into one or more of the different experience classes. In some aspects, such conversion may only be permitted when a predetermined condition is met. Various predetermined conditions may be imposed. For example, the software may prevent conversion until a vehicle has been upgraded to a particular status. For example, all objects in the same tech tree as a vehicle might be required to be unlocked before conversion from the first experience class to the second experience class is permitted. Such a vehicle is said to be an "elite" vehicle or having acquired elite status. A cost may be imposed on the user for conversion (e.g., Alternative Currency).

In other aspects, players may have the option to convert Battle experience to Free experience under different conditions. For example, "Premium" vehicles may be available to a player in exchange for Alternative Currency. A Premium vehicle may refer to a vehicle similar to an elite vehicle in that the vehicle includes all possible module upgrades and vehicles within the same tech tree family, however, the Premium vehicle may be purchased for the alternative currency whereas the elite vehicle was unlocked using one or more classes of experience through gameplay. Players who purchase Premium vehicles may be permitted to convert Battle experience to Free experience without first achieving any predetermined condition in the Premium Vehicle. In other aspects, predetermined conditions imposed on Premium vehicles might be different from those imposed on non-Premium vehicles.

Figure 8:
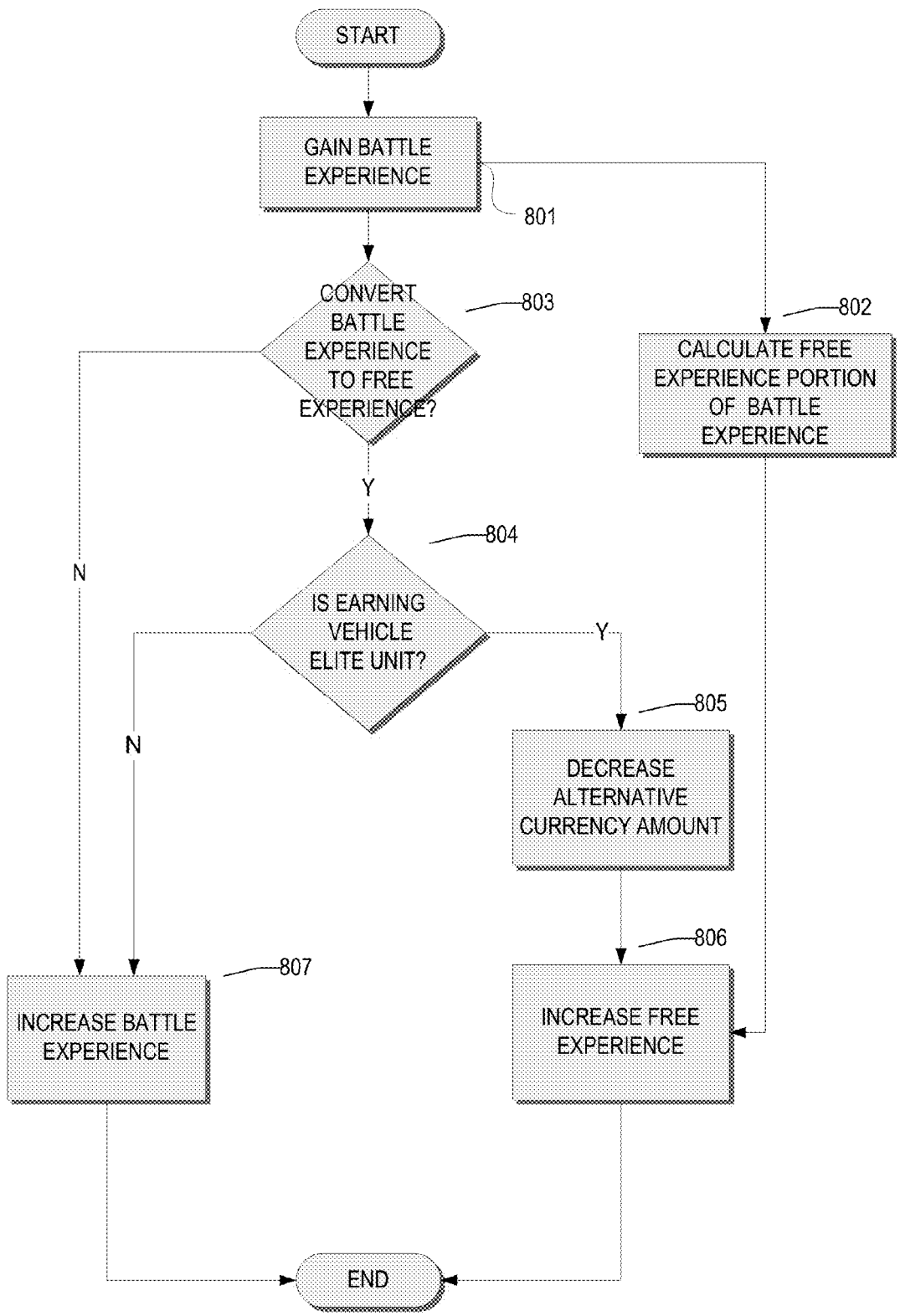
FIG. 8 illustrates a workflow describing various features described herein.

FIG. 8 provides an illustrative example of conversion between two different experience classes. A first class of experience may be defined herein as "Battle" experience. In step 801 the player receives Battle experience points based on the player's performance during a game session. Battle experience may be accumulated in step 801 based on various parameters including overall team performance during the battle, vehicle survival, combat activity (actively attacking targets and being attacked by enemies), number of targets detected, number of targets destroyed, critical damage caused to enemy, amount of points awarded for capturing enemy bases. A second class of experience, defined herein as "Free" experience, may also be obtained during play. In step 802, the software calculates Free experience as a portion of the Battle experience gained in step 801.

Steps 803-806 illustrate an example of converting points from a first experience class into a second experience class. In step 803 the player elects to convert Battle experience to Free experience. In step 804 the system determines whether the Battle experience the player wishes to convert is associated with an Elite Unit. Elite Units are vehicles in which all objects in the tech tree have been unlocked, including any modules that can be used with the vehicle as well as any variations of the vehicle included within the tech tree (see, e.g., medium tank and heavy tank in FIG. 6A). Elite Units may continue to accrue Battle experience during gameplay e.g. 801; however, because no further module upgrades for the earning vehicle can be unlocked, the Battle Experience cannot be used to upgrade the Elite Unit. In step 804, the system determines whether the predetermined condition for conversion has been met; e.g., whether the vehicle has obtained Elite Unit status 804. If Elite Unit status has not been achieved, conversion to Free experience is prevented. On the other hand, if Elite Unit status is achieved for the vehicle, Battle experience earned in the vehicle is converted to Free experience. In step 805 the system determines how much Alternative Currency (zero or more may be required) is required to convert the Battle experience into Free experience, and reduces the player's Alternative Currency amount accordingly. The user's Free experience is then increased in step 806. Battle experience earned in a non-Elite Unit may not be converted into Free experience.

If a user elects not to convert Battle experience to free experience (step 803) or the system determines that the vehicle in which the Battle experience points were earned is not an Elite Unit (step 804), then the Battle Experience is added to the player's total Battle Experience (step 807).

Figure 9:
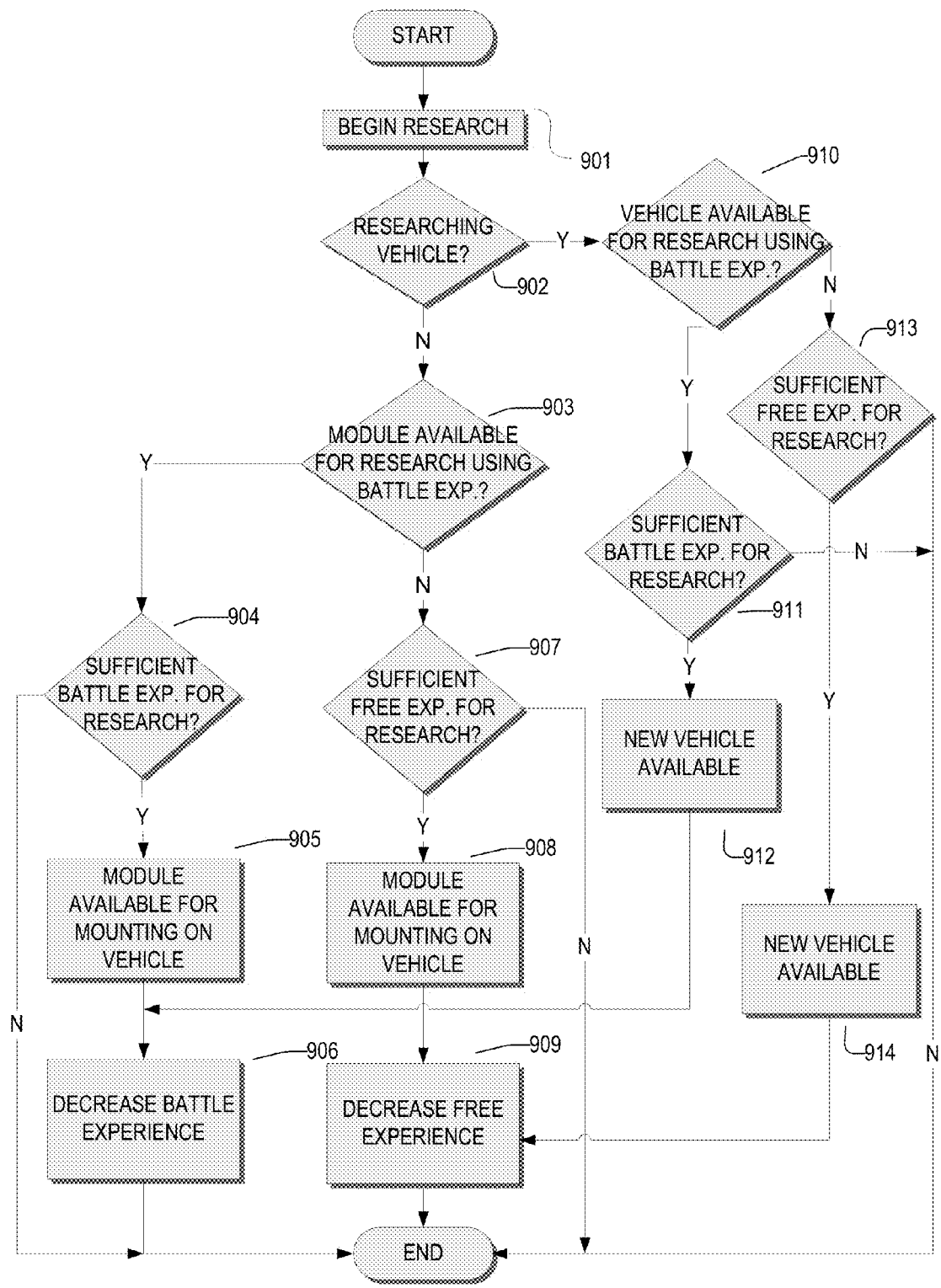
FIG. 9 illustrates a workflow describing various features described herein.

FIG. 9 illustrates an example of how the two classes of experience may be used to unlock advanced in-game objects such as vehicles and modules using research. In step 901 a player may initiate research on a vehicle or module. In step 902 the game software determines whether the player selected to research a vehicle. If so, in step 910 the software determines whether the vehicle may be researched using Battle experience. Battle experience might not be used to unlock new vehicles. For example, Battle experience might only be used to unlock vehicles available in the tech tree of the vehicles in which the Battle experience was earned. In some aspects, a hierarchy of vehicles is created within a tech tree; for example, a player might be required to unlock a new vehicle that has lesser attributes before being allowed to unlock other vehicles that have more advantageous attributes. Thus, the player may be required to unlock sequentially the next available vehicle in the earning vehicle's tech tree. If Battle experience may be used to unlock the vehicle, the software determines whether the player has sufficient Battle experience in step 911. If so, the new vehicle becomes available (step 912) and Battle experience is decreased by the amount of experience spent researching the vehicle (step 906).

If Battle experience may not be used to unlock the vehicle (e.g., the vehicle sought to be unlocked is outside the tech tree of the vehicle the player used to earn the Battle experience) the game software might next determine in step 913 whether the player has accumulated sufficient Free experience to research the selected vehicle. In some aspects, Free experience may be used to unlock any vehicle. If there is sufficient Free experience, then the new vehicle becomes available to the player in step 914, and the amount of the Free experience is decreased by the amount of Free experience spent researching the vehicle (step 909).

On the other hand, if the player elects to research a module, the software determines in step 903 whether the module can be researched using Battle experience. Battle experience may be used to research modules that can be mounted on the vehicle that the player used to earn the Battle experience points. FIG. 6B shows an example of unlockable vehicles arranged in a tech tree format. In step 904 the software determines whether the player has accumulated sufficient Battle Experience to unlock the module. If so, step 905 unlocks the module making it available for purchase and mounting on the vehicle. Step 906 decreases the amount of the player's Battle experience by the amount of experience spent researching the module.

If the software determines in step 903 the module cannot be researched using Battle experience, then, in step 907, the system determines whether the player has sufficient Free experience to unlock the module. If so, step 908 unlocks the module making it available for purchase and mounting on the vehicle. Step 909 decreases the amount of the user's Free experience by the amount of experience spent researching the module.

Figure 6A:
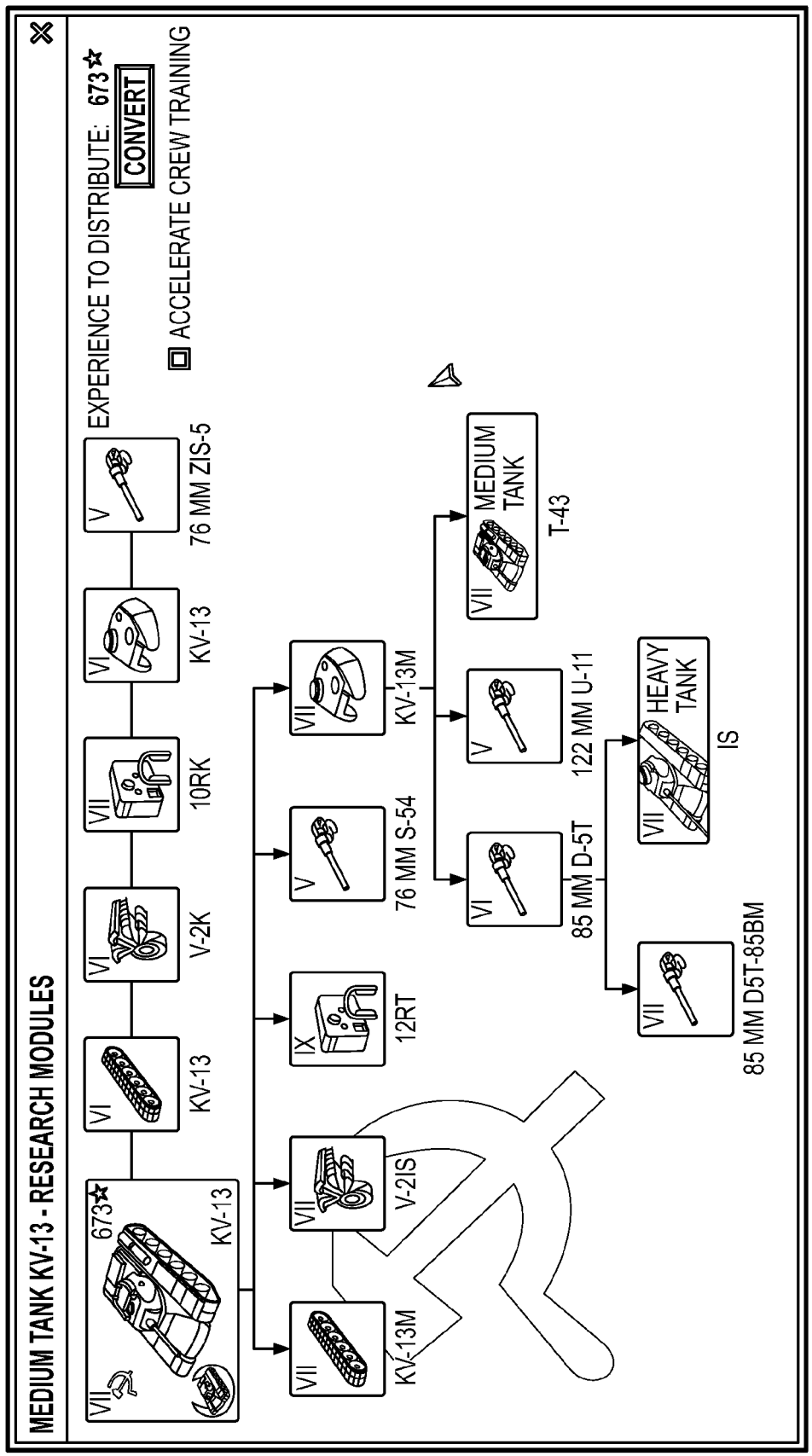
FIG. 6A illustrates a screenshot of a video game implementing one or more illustrative aspects described herein.
Figure 6B:
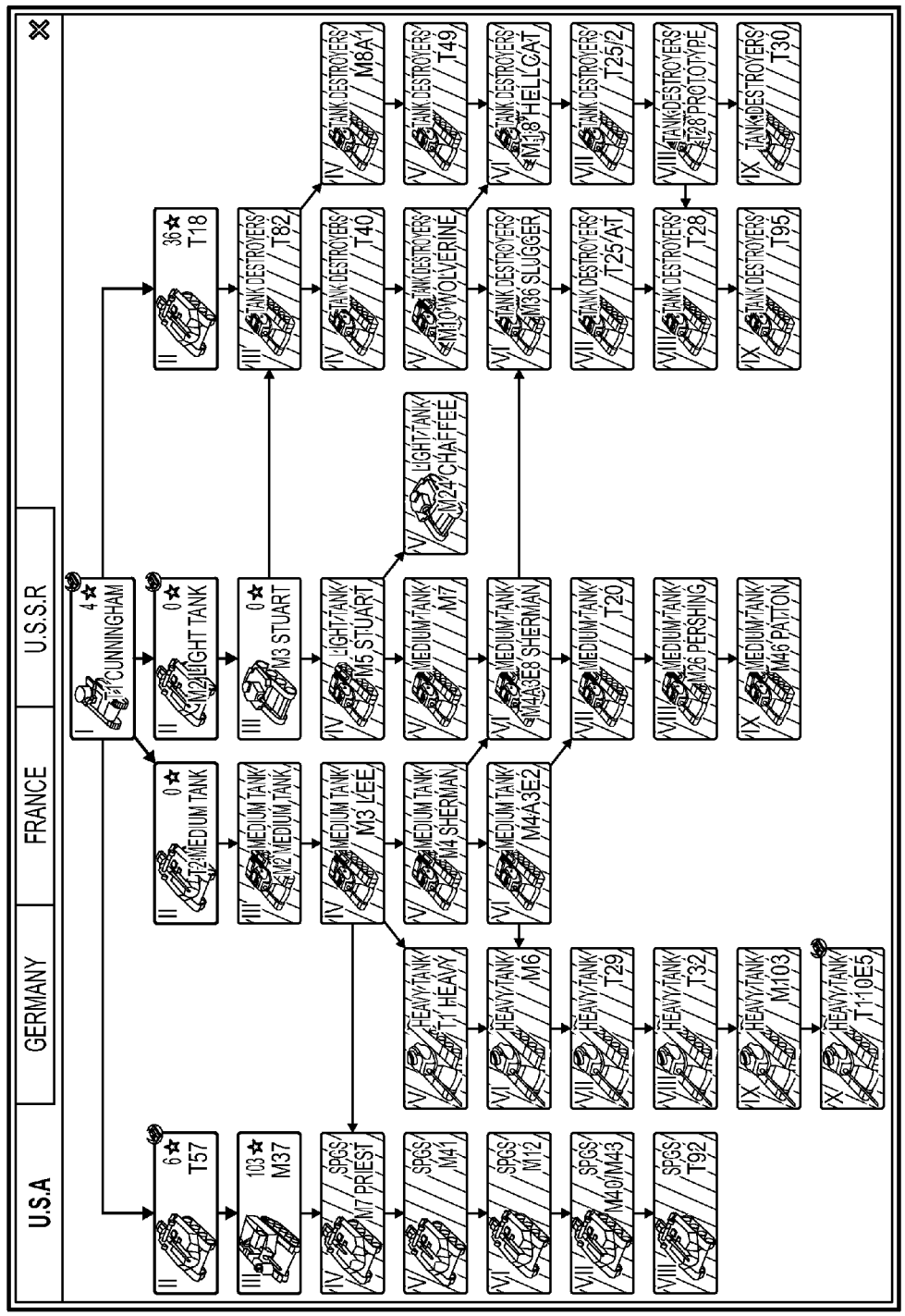
FIG. 6B illustrates a screenshot of a video game implementing one or more illustrative aspects described herein.
Figure 7:
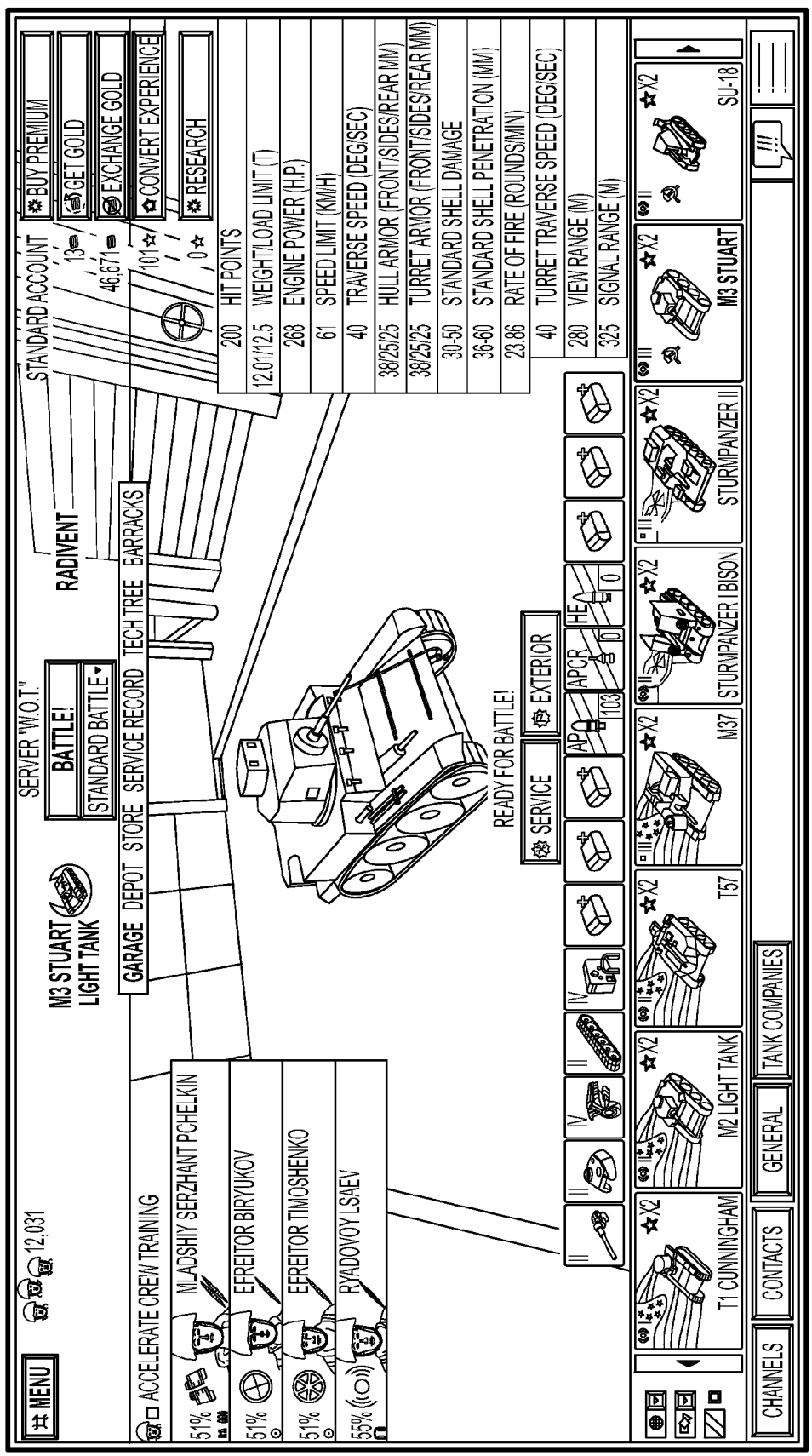
FIG. 7 illustrates a screenshot of a video game implementing one or more illustrative aspects described herein.

FIG. 6A shows a screenshot of an example tech tree (also known as a game progress tech tree) for a Medium Tank object KV-13. All modules and available tanks (e.g. T-43) present in the tech tree have been unlocked and are available for player use. FIG. 6B shows a screenshot of a tank tech tree that may be researched for a T1 Cunningham tank object. FIG. 7 is an example of a main screen of an illustrative game.

The use of Alternative Currency (e.g., money) described above may be structured to minimize or eliminate the ability of players to upgrade vehicles or characters simply by spending large amounts of money. In the examples described above, this objective is achieved by limiting access to particularly advantageous game benefits, such as new vehicles, to Free experience. Because Free experience may be awarded to a player at a rate substantially less that the rate Battle experience accumulates, the ability of a beginning player to access new vehicles and upgraded modules is limited. Further, because the only other source of Free experience requires Battle Experience earned on an Elite Unit, a new player may not immediately acquire advanced vehicles by using Alternative Currency.

Making player merit the main route for a player achieving upgraded vehicles is a particularly effective way of retaining players. New players recognize that advancing in the game depends substantially on merit because the game must be played to advance. Players are therefore more inclined to keep playing because they are not dissuaded from developing their vehicle by the possibility that a newcomer may gain advanced status simply by paying money.

Exporting Experience from the First Game

In some aspects, the disclosure provides for exporting objects such as characters, vehicles and modules for use in other video games. After playing a game for a period of time, the player may have gained and spent experience, as well as money, to research, develop, and/or purchase an object 551 such as a vehicle with advanced attributes and/or an experienced crew 501. Over time, however, a player may become less interested in a game due to repetitive gameplay or completion of the game. Player retention can be enhanced by allowing the player to recapture the effort expended in the first game for use in a second game. As used herein, a "second" video game refers to another game that is not merely another instance of the first video game loaded or executing on a different server. The second video game has different mechanics, goals, objectives, features, and/or gameplay from the first video game.

In some aspects of the disclosure, the experience accumulated in a first video game may be exported to a different game. For example, the Battle experience and/or Free experience points may be exported to a second video game to allow the player to acquire objects in the second game. In some examples both may be exportable. In other example, only Free experience may be exported from one game to another.

Figure 10:
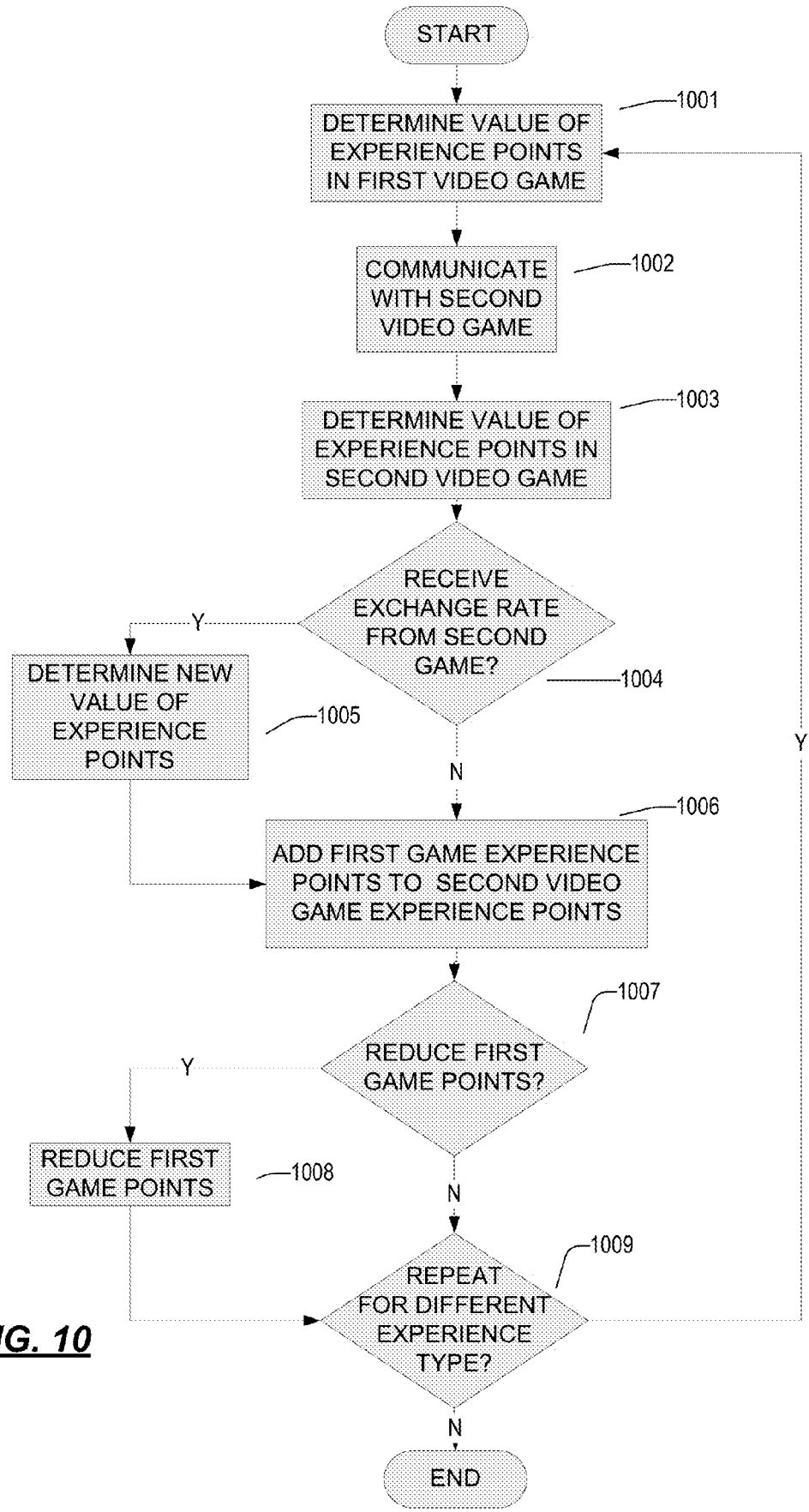
FIG. 10 illustrates a workflow describing various features described herein.

FIG. 10 illustrates an aspect of exporting experience points to a second game. In step 1001, the system determines the value of the experience points in the first video game 1001 for a particular experience class. In step 1002, the system contacts a video game 1003 (e.g., by contacting a central exchange server, using a lookup table, or the like) and may determine, in step 1003, the value of experience points in the second video game.

Experience gained in the first video game may but need not be awarded the same value as experience in the second game. Optionally, the second game may employ an exchange rate to alter the value of experience points gained in the first game (steps 1004-1006). In step 1004, the software determines whether the second game requires that experience points from the first game are converted according to an exchange rate. If so, step 1005 determines the new value for the first game experience points before adding them, in step 1006, to the second game experience points. On the other hand, if there is no need to alter the value of the first games experience points, then, in step 1006, the experience points from the first and second game are combined. When experience points are transferred from a first game to a second game the points in the first game may, but need not, be reduced or eliminated from the player's account in the first video game. In step 1007, the software determines whether the experience points in the first game should be reduced. The amount of the reduction may be determined by either the first game or the second game (not shown). If the software determines the experience points should be decreased, the points in the first game are decreased (step 1008). By allowing the player to retain experience points in the first game, the player is enticed to play the second game while continuing to play the first game. In step 1009, the software determines whether there are one or more additional classes of experience that may be exported from the first game to the second game 1009. Each class of experience may be subject to a different exchange rate.

In other aspects, the player may directly export game objects. For example, if a player has developed an advanced tank and experienced crew in a first game, that tank and/or crew may be used in a second game that features other modes of combat in addition to tanks, such a ground troops, planes, and/or battleships. In one aspect, the vehicle may be moved or copied to the second game. In another aspect, the user might be able to export a vehicle object out of a first game and then import a comparable vehicle object into a second game. For example, when a user requests to export a tank vehicle having attributes A, B, and C from WORLD OF TANKS to another game involving airplanes (e.g., WORLD OF WARPLANES), an airplane object may be created having similar or comparable attributes as the tank exported from WORLD OF TANKS. A similar or comparable ship, boat, or submarine may be created if the user requests that the vehicle be moved to game involving seaworthy vehicles (e.g., WORLD OF WARSHIPS).

Object instances e.g. 551 may be exported from a first video game with one or more attributes 557 and/or one or more modules 559 associated with the object instance to a second, receiving, video game. In some aspects, all researched modules and vehicles researched and purchased in the first game may be exported to the second game. In other aspects, the second game may dictate which modules and vehicles may be accepted into the second game, and whether they vehicles and modules are accepted as-is, or are imported as a comparable vehicle and/or module.

In other aspects, the first game may allow the player to exchange or "sell" the object instances 551 (e.g., vehicles, modules, and/or characters) for experience points that can be used to acquire objects in the second game. Such a feature may find particular use where the object and/or attributes might not be appropriate in the context of the second game. For example, a light tank may be appropriate for a second game involving warfare set in the same or a similar era; however, the same tank may be inappropriate for a space-based warfare game. Further, by allowing the player to convert objects back into experience points that may be exported to the second game, the player is rewarded for time and money spent in the first game. The player will therefore be enticed to continue playing games that share the portable experience system, greatly enhancing player retention.

The present aspects have been described in terms of preferred and exemplary embodiments thereof. Numerous other embodiments, modifications and variations within the scope and spirit of the appended claims will occur to persons of ordinary skill in the art from a review of this disclosure.

What is claimed is:

1. One or more non-transitory computer readable media storing computer executable instructions that, when executed by one or more computer processors, cause a system to perform:

defining a first class of experience in a first graphically simulated virtual world hosted on one or more game servers, said graphically simulated virtual world simulating two opposing pluralities of military vehicles, wherein the first class of experience is earned when a user uses a first vehicle in the first plurality in the graphically simulated virtual world against a second vehicle in the second plurality, wherein unless a predetermined condition is met said first class of experience is usable only to unlock objects in a same tech tree as the first vehicle;

defining a second class of experience in the first graphically simulated virtual world, wherein the second class of experience is earned when the user uses the first vehicle in the first graphically simulated virtual world, and wherein the second class of experience is usable to unlock vehicles other than the first vehicle, and further usable to upgrade objects not compatible with the first vehicle; and transferring the second class of experience from the first graphically simulated virtual world to a second graphically simulated virtual world, wherein the second graphically simulated virtual world is not another instance of the first graphically simulated virtual world.

2. The computer readable media of claim 1, wherein said instructions, when executed, further cause the system to perform:

receiving user input to convert the first class of experience to the second class of experience;

when the predetermined condition has been met, converting the first class of experience to the second class of experience; and when the predetermined condition has not been met, preventing conversion of the first class of experience to the second class of experience.

3. The computer readable media of claim 1, wherein the predetermined condition is all objects in the same tech tree as the first vehicle have been unlocked.

4. The computer readable media of claim 1, wherein the predetermined condition is the payment of money by the user.

5. The computer readable media of claim 1, wherein the predetermined condition is the payment of in-game currency by the user.

6. The computer readable media of claim 1, wherein transferring is performed by:
- determining an exchange rate between the first video game and second video game;
- removing a user-requested amount of the second class of experience from an account associated with the user in the first video game; and
- adding experience points to an account associated with the user in the second video game, said added experience points calculated by multiplying the exchange rate by the user-requested amount of the second class of experience.

7. A system comprising:
a processor; and
memory storing computer executable instructions that, when executed by the processor, cause the system to perform:
- defining a first class of experience in a first graphically simulated virtual world hosted on one or more game servers, said graphically simulated virtual world simulating two opposing pluralities of military vehicles wherein the first class of experience is earned when a user uses a first vehicle in the first plurality in the graphically simulated virtual world against a second vehicle in the second plurality, wherein unless a predetermined condition is met said first class of experience is usable only to unlock objects in a same tech tree as the first vehicle;
- defining a second class of experience in the first graphically simulated virtual world, wherein the second class of experience is earned when the user uses the first vehicle in the first graphically simulated virtual world, and wherein the second class of experience is usable to unlock vehicles other than the first vehicle, and further usable to upgrade objects not compatible with the first vehicle; and
- transferring the second class of experience from the first graphically simulated virtual world to a second graphically simulated virtual world, wherein the second graphically simulated virtual world is not another instance of the first graphically simulated virtual world.

8. The system of claim 7, wherein said instructions further cause the system to perform:
- receiving user input to convert the first class of experience to the second class of experience;
- when the predetermined condition has been met, converting the first class of experience to the second class of experience; and
- when the predetermined condition has not been met, preventing conversion of the first class of experience to the second class of experience.

9. The system of claim 7, wherein the predetermined condition is all objects in the same tech tree as the first vehicle have been unlocked.

10. The system of claim 7, wherein the predetermined condition is the payment of money by the user.

11. The system of claim 7, wherein the predetermined condition is the payment of in-game currency by the user.

12. The system of claim 7, wherein transferring is performed by:
- determining an exchange rate between the first video game and second video game;
- removing a user-requested amount of the second class of experience from an account associated with the user in the first video game; and
- adding experience points to an account associated with the user in the second video game, said added experience points calculated by multiplying the exchange rate by the user-requested amount of the second class of experience.

13. A method of administering a massive multiplayer online game, comprising:
- defining a first class of experience in a first graphically simulated virtual world hosted on one or more game servers, said graphically simulated virtual world simulating two opposing pluralities of military vehicles;
- awarding an amount of the first class of experience to a user in the first graphically simulated virtual world when the user uses a first vehicle in the first plurality in the graphically simulated virtual world to accomplish an objective associated with the first plurality of military vehicles, said objective being defined as mutually exclusive to an objective associated with the second plurality of military vehicle;
- restricting said first class of experience for use only to unlock objects in a same tech tree as the first vehicle, unless a predetermined condition is met;
- defining a second class of experience in the first graphically simulated virtual world;
- awarding an amount of the second class of experience to the user when the user uses the first vehicle in the first graphically simulated virtual world to accomplish the objective;
- permitting use of the second class of experience to unlock vehicles other than the first vehicle, and further use to upgrade objects not compatible with the first vehicle; and
- transferring the second class of experience from the first graphically simulated virtual world to a second graphically simulated virtual world, wherein the second graphically simulated virtual world is not another instance of the first graphically simulated virtual world.

14. The method of claim 13, further comprising:
- receiving user input to convert the first class of experience to the second class of experience;
- when the predetermined condition has been met, converting the first class of experience to the second class of experience; and
- when the predetermined condition has not been met, preventing conversion of the first class of experience to the second class of experience.

15. The method of claim 13, wherein the predetermined condition is all objects in the same tech tree as the first vehicle have been unlocked.

16. The method of claim 13, wherein the predetermined condition is a payment by the user.

17. The method of claim 13, wherein transferring comprises:
- determining an exchange rate between the first video game and second video game;
- removing a user-requested amount of the second class of experience from an account associated with the user in the first video game; and
- adding experience points to an account associated with the user in the second video game, said added experience points calculated by multiplying the exchange rate by the user-requested amount of the second class of experience.

\* \* \* \* \*